July 30, 1968   C. T. HENNE   3,394,536
RAKE
Filed May 26, 1965
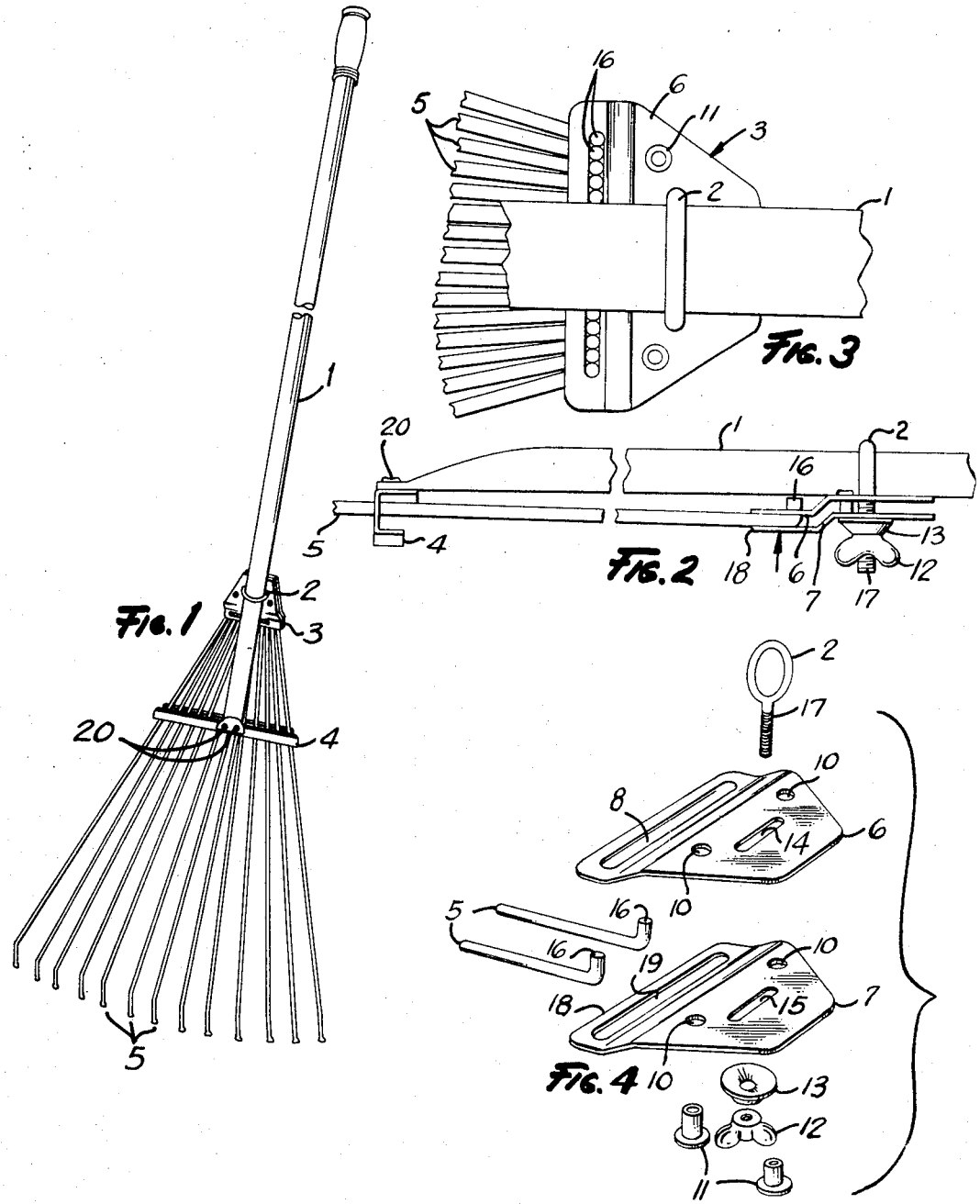
INVENTOR.
CHARLES T. HENNE
BY
ATTORNEYS

United States Patent Office 3,394,536
Patented July 30, 1968

3,394,536
RAKE
Charles T. Henne, 3277 Allen St.,
Hudsonville, Mich. 49426
Filed May 26, 1965, Ser. No. 458,997
5 Claims. (Cl. 56—400.18)

ABSTRACT OF THE DISCLOSURE

A retractable tine rake including a tine retainer clip slidable along the handle which, in conjunction with a guide member on the extremity of the handle, permits the tines to be selectively spread out or retracted. The retainer clip is fabricated from two identical brackets, an elongate slot in one of the brackets being utilized to retain the upper extremities of the tines therein. The bracket is drawn against the handle by means of an eye bolt passing over the handle and having its threaded extremity protruding through the clip.

---

This invention relates to rakes, and more particularly to rakes having tines which may be retracted for storage purposes.

Conventional rakes having retractable tines consist of a handle, a tine guide mounted at the end of the handle and perpendicular thereto, a set of tines, and a tine clip slidably mounted on the handle. It is the purpose of the tine clip to pivotally secure the tines in a manner that they can be spread apart and retracted by moving the clip up and down the handle. Previous methods of fabricating the tine clip have required either two dissimilar brackets between which the tines are secured or a bracket containing a rectangular depression in which the tines are secured. Tine retainer clips fabricated in these manners have been generally unsatisfactory because of the expense involved in stamping two different types of brackets and because of the expense involved in stamping a bracket with a rectangular depression.

The apparatus provided for sliding the tine retainer clip up and down the handle on conventional rakes having retractable tines has also proved most unsatisfactory. Provisions for effecting this movement generally consist of either a slot formed in the handle which the tine guide engages or of a U-bolt fastened around the periphery of the handle and affixed to the tine retainer clip. In the slotted handle model there is a tendency for the tine retainer clip to become bound in the slot. This tendency is compounded by slight bendings of the handle which naturally occur during ordinary use. Also the necessity to slot the tubular handle causes the loss of the major portion of the durability of the handle. In addition it is very difficult to secure the tine retainer clip to the handle at various positions along the slot as a tendency exists for the tine retainer clip to slide whenever pressure is exerted on the ends of the tines. The U-bolt method of affixing the tine retainer clip to the handle also suffers from this last mentioned deficiency. It is hardly possible to tighten the U-bolt sufficiently by hand to prevent the tine retainer clip from turning around the periphery of the handle thus causing the tine ends to lay flat on the surface to be raked. In addition many conventional tine retainer clips allow the tines to slip from the clips when the securing means is allowed to come unscrewed.

Conventional retractable rakes have the tine guide mounted on the end of the handle in such a manner that it can rotate whenever more pressure is exerted on one side of the rake than on the other. This construction has proved unsatisfactory, particularly in the slotted model, since any rotation of the tine guide will cause the slot to be deformed.

It is an object of this invention to provide a method of fabricating a rake having retractable tines which is not subject to the aforementioned difficulties of conventional rakes of this type.

More specifically it is an object of this invention to provide a retractable tine rake having the tine retainer clip fabricated from two identical parts thus effecting a substantial saving in manufacturing expense. These brackets are independently affixed together to prevent the tines from ever escaping the retainer clip regardless of the position of the retainer clip fastening means.

It is an object of this invention to provide a means whereby a retractable tine rake may be adjusted to the desired width by a serviceable mechanism which will not fail when the handle becomes slightly deformed or bent.

It is an object of this invention to provide a means whereby a retractable tine rake may be positioned and the tine retainer clips so secured to the handle of the rake that tine ends cannot be forced to flat out on the surface to be raked but will remain in a serviceable position at any point of adjustment.

It is another object of this invention to provide means for affixing the tine retainer clip to the handle in such a manner that it will not slip unless such slipping is desired by the operator.

It is another object of this invention to provide a retractable tine rake having a tine guide which will not rotate about the handle when uneven pressure is applied to one side of the rake.

These and other objects of this invention will become more clear by reference to the following figures in which:

FIG. 1 is a perspective view of a retractable tine rake embodying the principles of this invention;

FIG. 2 is a partial side view of a rake showing the means with which the tine guide is attached to the end of the handle and the means with which the tine retainer clip is adjusted along the length of the handle;

FIG. 3 is a top view of the tine retainer clip and the means with which it is affixed to the handle; and FIG. 4 is an exploded view of the tine retainer clip.

Briefly the objects of this invention are accomplished by providing an elongated tubular member with one end thereof flattened so that the tine guide may be affixed thereto in such a manner that it will not rotate about the handle. A plurality of tines pass through aligned apertures in the tine guide. These tines have their upper ends bent over for mounting into one of the slots in one of the brackets forming the tine retainer clip. The second tine retainer bracket is placed over and independently affixed to the first tine retainer bracket in such a manner that the tines are pivotally and securely mounted in the tine retainer clip. The tine retainer clip is provided with another slot formed by two mating slots in the first and second tine retainer brackets. This slot functions to receive a threaded member which protrudes from the outer periphery of the circular ring slideably mounted on the tubular handle. This slot is sufficiently wide to slide completely over the circular sliding member allowing the tine retainer clip to abut to the tubular handle. Means are then provided for fastening and pressing the tine retainer clip against the tubular handle when it is desired to secure the tine retainer clip in any given position.

Referring now to the drawings a preferred embodiment of this invention will now be illustrated in detail. FIG. 1 shows a retractable tine rake having a handle 1 at one extremity of which is mounted a tine guide 4. The tines 5 are pivotally mounted in tine retainer clip 3 and a means is provided whereby the tine retainer clip may be slid up and down the length of the handle to achieve the desired tine spread. The tine guide 4 is provided with a series of aligned apertures through which tines pass (not shown). The tine guide is affixed to the lower extremity of handle 1 by first flattening that portion of the handle and then, using suitable fastening means such as rivets 20, connecting the tine guide to the handle in a generally perpendicular fashion such as shown in FIG. 1.

Referring to FIG. 4 the specific construction of the tine retainer clip and the means for moving it will now be explained. The tine retainer clip is formed from two identical backets 6 and 7. Each of these brackets is provided with mating first slots 8 and 9, mating apertures 10, and mating second slots 14 and 15. The upper portion of each of the tines 5 is bent out of longitudinal alignment as shown generally at 16. These upper portions are inserted into slot 8 in bracket 6. Bracket 7 is then placed adjacent bracket 6 as shown best in FIG. 2. The brackets 6 and 7 are rigidly affixed to one another by suitable fastening means such as the rivets shown at 11. These rivets are placed through mating apertures 10 as will be seen by reference to FIG. 2. This fastening process is effective to bring lip 18 into pressure relationship to the back of tines 5 and thus keep them from coming out of the tine retainer clip.

As shown best in FIGS. 2 and 3 a circular ring 2 having a threaded member 17 extending from the outer periphery thereof surrounds handle 1. The ring 2 has an inner diameter of sufficient dimensions to allow it to slide freely along handle 1. This ring may, for example, be an ordinary eye bolt. The threaded member extending from this ring is received by mating slots 14 and 15. Slots 14 and 15 are sufficiently wide to allow the tine retainer clip to slide over that portion of the circular ring from which threaded member 17 extends and abut the handle 1. A concave washer means 13 is then received by threaded member 17. This washer must also have inner dimensions of sufficient magnitude to allow it to pass over the outer periphery of slideably mounted ring 2. A suitable fastener, such as the wing nut shown at 12, is then attached to threaded member 17.

When it is desired to spread or retract the tines of the rake, fastening means 12 is loosened. The slack created in the threaded member 17 allows the tine retainer clip 3 to cease pressing against handle 1. Tine retainer clip 3 may then be moved along the length of handle 1. Tines 5 pivot inside the tine retainer clip 3 and spread or retract their outer ends depending on the direction the tine retainer clip is being moved. When the desired width has been attained the fastening means 12 is retightened. This retightening causes tine retainer clip 3 to be pressed securely against handle 1 preventing any undesirable slipping. The tine retainer bracket will remain in this position until the fastening means 12 is again loosened.

While a preferred embodiment of this invention has been illustrated it is obvious that other embodiments which incorporate the principles of this invention can be designed. Such of these modified embodiments as incorporate the principles of this invention are to be considered as included in the hereinafter appended claims unless these claims by their language expressly state otherwise.

I claim:

1. A retractable tine rake having a handle, a set of tines, tine guide means, a tine retainer clip, and means whereby the relative position of the tine retainer clip may be adjusted along said handle, said tine retainer clip comprising: two identical brackets, each of said brackets having a first slot therein, the upper ends of said tines being bent out of longitudinal alignment with the body of the tine and being passed through said first slot in the first of said identical brackets in row-like fashion, the second of said identical brackets being positioned adjacent said first bracket in mating fashion and affixed thereto in such a manner that the tines are pivotally mounted between said two identical brackets.

2. A retractable tine rake as set forth in claim 1 in which said means for adjusting the relative position of the tine retainer clip along said handle comprises:
a slidably mounted member passing completely around said handle;
a fastening member extending outwardly from and affixed to said slideably mounted member;
second mating slots in said first and second identical brackets for receiving said threaded member, said second mating slots being sufficiently wide to allow said tine retainer clip to pass over a portion of said slideably mounted member and abut the handle; and
fastening means mating with said fastening member, said fastening means being effective when tightened to press said tine retainer clip against said handle rendering said slideably mounted member immovable.

3. A retractable tine rake as set forth in claim 2 further having means for affixing said tine guide to said handle, said means comprising:
a flattened portion at one extremity of said handle, said tine guide being rigidly affixed to said flattened portion in such a position that it is generally perpendicular to said handle.

4. In a collapsible rake the combination comprising:
an elongated tubular member flattened at one end;
a rigid tine guide affixed to said flattened end, said tine guide having a row of guide apertures along its length and being so positioned with respect to said flattened end that the row of guide apertures is generally perpendicular to said tubular member;
a plurality of tines passing through said guide apertures;
a slidably mounted circular ring passing over said tubular member; said ring having a threaded member extending radially from the outer periphery thereof;
a tine retainer clip formed from two identical brackets, each of said brackets having a first and second slot therein, said upper end portions of said tines being bent out of longitudinal alignment with the body of the tines and being passed through the first slot in the first of said identical brackets in row-like fashion, the second of said identical brackets being positioned adjacent the first bracket in mating fashion and affixed thereto in such a manner that the tines are pivotally mounted between said two identical brackets, the mating second slots of said identical brackets being passed over the threaded member on said slidably mounted circular ring, said mating second slots in said identical brackets being sufficiently wide to allow said tine clip to pass over a portion of said circular sliding member and abut the tubular member;
a threaded fastening means on said threaded member effective to press said clip against said tubular member when said fastening means is tightened.

5. In a collapsible rake the combination comprising:
an elongated tubular member flattened at one end;
a rigid tine guide affixed to said flattened end, said tine guide having a row of guide apertures along its length and being so positioned with respect to said flattened end that the row of guide apertures is generally perpendicular to said tubular member;
a plurality of tines passing through said guide apertures;
a slidably mounted circular ring passing over said tubular member; said ring having a threaded member extending radially from the outer periphery thereof;
a tine retainer clip formed from two identical brackets, each of said brackets having a first and second slot therein, said upper end portions of said tines being bent out of longitudinal alignment with the body of said tines and being passed through the first slot in the first of said identical brackets in row-like fashion, the second of said identical brackets being positioned adjacent the first bracket in mating fashion and affixed thereto in such a manner that the tines are pivotally mounted between said two identical brackets, the mating second slots of said identical brackets being passed over the threaded member on said slidably mounted circular ring, said mating second slots in said identical brackets being sufficiently wide to allow said tine clip to pass over a portion of said circular sliding member and abut the tubular member;

a threaded fastening means on said threaded member; and conical washer means for reserving a portion of said circular sliding member and pressing said clip against said tubular member when said fastening means is tightened.

References Cited

UNITED STATES PATENTS

| | | | |
|---|---|---|---|
| 1,663,395 | 3/1928 | Tanaka | 56—400.18 |
| 2,625,357 | 1/1953 | Atkinson | 287—58 X |
| 2,904,951 | 9/1959 | Glover | 56—400.18 |
| 3,258,903 | 7/1966 | Reinacker | 56—400.18 |

ABRAHAM G. STONE, *Primary Examiner.*

P. RAZZANO, *Assistant Examiner.*